United States Patent [19]

Shiki

[11] Patent Number: 5,501,224
[45] Date of Patent: Mar. 26, 1996

[54] ULTRASONIC DIAGNOSTIC APPARATUS

[75] Inventor: Eiichi Shiki, Tochigi, Japan

[73] Assignee: Kabushiki Kaisha Toshiba, Kawasaki, Japan

[21] Appl. No.: 395,929

[22] Filed: Feb. 28, 1995

[30] Foreign Application Priority Data

Feb. 28, 1994 [JP] Japan .................................. 6-029197

[51] Int. Cl.⁶ .................................................. A61B 8/00
[52] U.S. Cl. ........................................................ 128/661.10
[58] Field of Search ......................... 128/660.07, 661.08, 128/661.09, 661.10, 916; 73/861.25

[56] References Cited

U.S. PATENT DOCUMENTS

| | | | |
|---|---|---|---|
| 4,583,552 | 4/1986 | Iinuma | 128/661.09 |
| 5,313,947 | 5/1994 | Micco | 128/661.09 |

FOREIGN PATENT DOCUMENTS 63-272333 of 0000 Japan.

OTHER PUBLICATIONS

JSUM Proceedings, pp. 299–300, D. Morita et al, Nov. 1987.

*Primary Examiner*—George Manuel
*Attorney, Agent, or Firm*—Oblon, Spivak, McClelland, Maier & Neustadt

[57] ABSTRACT

An ultrasonic diagnostic apparatus including a probe which transmits a burst wave of ultrasonic pulses into a target in a body and receives reflected echo signals, a transmission unit which drives the probe, a receiver which delays the echo signals from the probe by delay times substantially equal to the delay times in the transmission unit, 2D image processing unit which performs predetermined processing on the output signals from the receiver in order to indicate a tomographic image, a Doppler-mode processing unit which performs predetermined processing on the output signals from the receiver in order to indicate the frequency spectrum of the received signals, a display unit which displays each processed result from the a 2D image processing unit and the Doppler-mode processing unit, a sample volume setting device which designates an observation region (sample volume) such as observation length (spatial length of the sample volume) and observation location (sample volume depth) to obtain a Doppler shift frequency, and a control unit which controls the transmission unit and the Doppler processing unit so that a width of a range gate is smaller than the width of an observation region designated by the sample volume setting device.

29 Claims, 4 Drawing Sheets

TIME VARIATION OF
DOPPLER FREQUENCY SPECTRUM

ULTRASONIC DIAGNOSTIC APPARATUS

BACKGROUND OF THE INVENTION

1. Field of the Invention

The present invention relates to an ultrasonic diagnostic apparatus which transmits ultrasonic waves to a moving target such as blood flow and detects frequency shifts (Doppler shifts) of reflected ultrasonic waves from the blood flow to detect the flow direction and velocity.

2. Description of the Related Art

The ultrasonic diagnostic apparatus is used in the medical field to provide information in regard to a moving substance, e.g., a cardiovascular blood flow or moving tissue. The ultrasonic wave transmitted into a patient undergoes a frequency shift when the wave is reflected by a moving substance such as blood flow due to the Doppler effect. The velocity of the blood flow can be non-invasively observed by detecting a Doppler signal indicative of the frequency difference between transmitted and received ultrasonic wave.

In the ultrasonic diagnostic apparatus, a burst wave in the form of a series of ultrasonic pulses is used to detect the Doppler signal, since the burst wave has a better signal-to-noise ratio than the single ultrasonic wave. The frequency band of the burst wave is narrower than the single ultrasonic pulse.

In the case of using a burst wave to detect the Doppler signals, the Doppler information of the moving target, such as blood flow velocity, is obtained as follows. As shown in FIG. 3(a), a conventional ultrasonic diagnostic apparatus provides a two dimensional echographic image (2D image, tomographic image) of a patient and a sample volume marker (to be referred to as a marker) indicating observation region on a TV-monitor. An operator adjusts the location and length of the marker to the region of interest (ROI) such as blood vessel on the TV-monitor. Then, the burst wave is repeatedly transmitted from the ultrasound probe into a moving substance of the patient. Echo signals of the burst wave reflected from a moving substance of the patient are received by the ultrasonic probe. The received echo signals are processed to detect the Doppler signal by a conventional method such as quadrature phase detection. Then, the burst wave is repeatedly transmitted and received for the same direction several times. Thus, the Doppler signals can be acquired from the echo signal. The Doppler signals are gated by a range gate circuit in correspondence with the observation range. Only Doppler signals corresponding to the observation range are obtained. A low pass filter obtains the needed Doppler shift frequency by rejecting unnecessary low frequency component of the Doppler signals such as due to a slow movement in a patient. The operation circuit performs processing such as by means of the Fast Fourier Transform (FFT), on the Doppler signals. Namely, the operation circuit obtains the relation between frequency and amplitude to calculate some sampling data (the Doppler signals). The frequency spectrum is converted into luminance by a digital scan converter (DSC), and is provided to a TV-monitor. On the TV-monitor, the relation between the Doppler shift frequency and (observation) time is displayed on the basis of the frequency spectrum. The velocity of blood flow is obtained by the Doppler shift frequency since the velocity of blood flow corresponds to the Doppler shift frequency.

However, the conventional ultrasonic apparatus has a problem next described referring to FIG. 4. FIG. 4 is a timing diagram illustrating the timing and the gate width of the gating of the range gate applied to the Doppler signals when a burst wave is transmitted once. The axis of abscissa shows time corresponding to the distance (depth) in the direction of depth from an extremity of the probe which is at a depth of zero. Signals p1–pn show in order of depth each phase boundary of acoustic impedance (scatter at each depth) on which the ultrasonic pulses reflect, starting from the shallowest position. As shown in FIG. 4, the conventional ultrasonic diagnostic apparatus gates the range gate for the range corresponding to the observation range (the marker) on the TV-monitor. However, the reflected echoes from each depth continue during the burst wave length when the reflected echoes are received, since the burst wave has a predetermined burst wave length. Therefore, it is impossible to obtain reflected echoes which correspond only to the gate width set in the range gate circuit. Namely, not only needed echoes but also unnecessary echoes (p3, p4 and p5 in FIG. 4) are gated. Thus, needed Doppler signals are mixed with the unnecessary Doppler signals. Therefore, the precision in distance about the sample volume in the marker is deteriorated by the mixed echoes. As a result, artifacts are generated in the frequency spectrum.

The conventional ultrasonic diagnostic apparatus uses a gate width corresponding to the space length of the marker, and varies the gate width according to variation of the space length of the marker. But under that condition, the signal-to-noise ratio is not always very good.

SUMMARY OF THE INVENTION

It is therefore an object of the present invention to provide an ultrasonic diagnostic apparatus which either improves either the precision of distance or the signal to noise ratio in the range of the observation.

The above object, and other objects, are achieved according to the present invention by providing a new and improved ultrasonic diagnostic apparatus, including an ultrasonic transmission and reception means for transmitting ultrasonic pulses into a moving target in the body, and receiving echo signals reflected from the moving target; driving means for generating ultrasonic pulses to be transmitted by said ultrasonic transmission and reception means; processing means for detecting Doppler signals by detecting phase of the echo signals; sample volume setting means for designating an observation region in the moving target by means of a range gate having a gate width; a sampling means for sampling the Doppler signals in the range gate; and a control means for controlling said sampling means so that the gate width may be smaller than the width of the observation region according to the designation of said sample volume setting means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

An illustrative embodiment of the present invention will be described hereinafter in detail with reference to the accompanying drawings. Note than a burst wave is a series of ultrasonic pulses repeatedly transmitted for a short time. A burst wave length is the time from when the burst wave is turned on to the time until the burst wave is turned off. A single burst wave is an ultrasonic pulse in the series of ultrasonic pulses which form the burst. A burst wave number is the number of the single burst waves, i.e., the number of pulses, in a burst wave each including plural ultrasonic pulses. The time cycle of a burst wave is the period between repeated transmission of successive burst waves.

Figure 1:
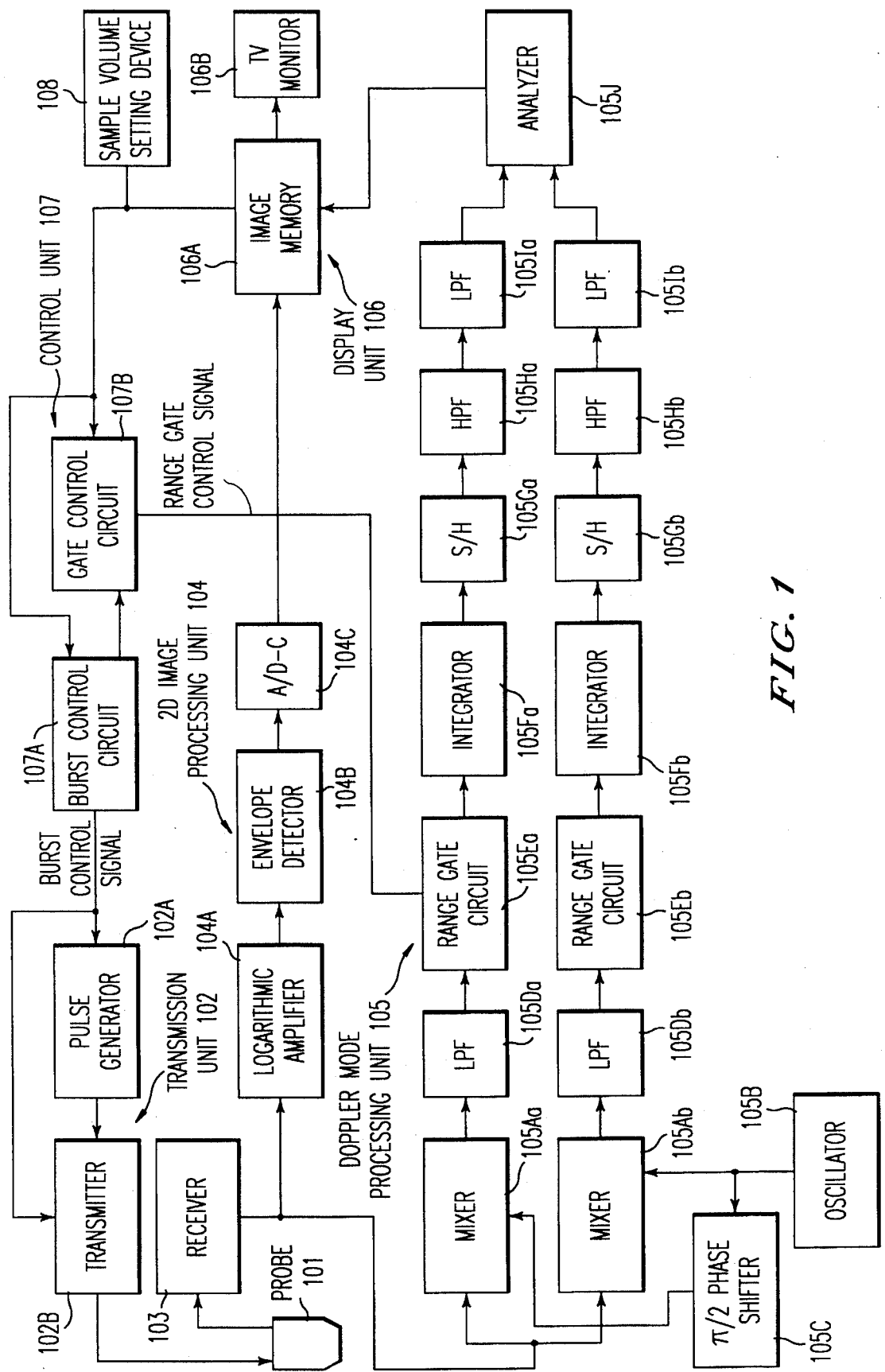
FIG. 1 is a block diagram of an ultrasonic diagnosis apparatus according to an embodiment of the present invention.

FIG. 1 is a block diagram of an ultrasonic diagnosis apparatus according to an embodiment of the present invention. Referring to FIG. 1, the apparatus includes a probe 101 which transmits ultrasonic pulses (the burst wave) and receives the reflected echo signals, a transmitter 102 which drives the probe 101, a receiver 103 which delays the echo signals from the probe 101 by delay times substantially equal to the delay times in the transmission unit 102, a 2D image processing unit 104 which performs predetermined processing on the output signals from receiver 103 in order to indicate a tomographic image, A Doppler-mode processing unit 105 which performs predetermined processing on the output signals from receiver 103 in order to indicate the frequency spectrum, a display unit 106 which indicates each processed result from the 2D image processing unit 104 and the Doppler-mode processing unit 105, a control unit 107 which performs predetermined control functions on the transmission unit 102 and the Doppler processing unit 105, and a sample volume setting device 108 which designates an observation region (sample volume) such as observation length (spatial length) and observation location (sample volume depth) to obtain the Doppler shift frequency. So hereinafter, a spatial length of a sample volume refers to a spatial length of the sample volume, and a sample volume depth refers to a distance in the depth direction from the probe 101.

The sample volume setting device 108 designates the space length or the depth of the sample volume, and converts the designated space length or depth of the sample volume into a predetermined time length. The sample volume setting device 108 includes an operation table which designates the sample volume, and a unit converter which converts the space length into a time length. In addition, the sample volume (to be referred to as the marker) indicated on the display unit 106 corresponds to the sample volume designated by the operation table when the space length or the depth of the sample volume is designated using the display unit 106. Then, the operation table is associated with a matching control, e.g., a trackball and a mouse corresponding to a movement of the marker. Namely, an operator can designate the space length or the depth of the sample volume by designating the observation region of the marker (length and depth of the marker) after moving the marker in the display unit 106 by using the matching control. The space length or the sample volume depth designated on the display unit 106 are converted into time by the unit converter. When the space length and the depth of the sample volume are $\chi$, the time corresponding to the space length and the depth of the sample volume is $\tau$, and a velocity of ultrasound is C, this conversation equation is given by $$\tau = 2\chi/C \quad (1)$$

Note that in the following discussion the words "space length" are not distinguished from the words "time corresponding to the length" in order to avoid complexity of explanation. Also the word "time" is not distinguished from the word "depth" because for the same reason. In addition the words "the sample volume" refer to the sum of a burst wave length and gate width, while the words "the designated sample volume" refer to the sample volume designated by the sample volume setting device 108.

The control unit 107 controls the transmission unit 102 and the Doppler-mode processing unit 105 according to the designation of the sample volume setting device 108. Control unit 107 includes a burst control circuit 107A which controls the transmission unit 102 (a pulse generator 102A and a transmitter 102B described hereinafter), and a gate control circuit 107B which controls the Doppler-mode processing unit (a range gate circuit 105Ea and a range gate circuit 105Eb described hereinafter).

The burst control circuit 107A establishes nature of the burst wave and provides the transmission unit 102 with burst control signals. Generally, the nature of the burst wave is determined by burst wave length, the number of burst waves, the time cycle of a burst wave, and burst voltage. If the time cycle of a burst wave is constant, the burst wave length is determined according to the number of burst waves. Therefore, the burst control circuit 107A designates either the number of bursts or burst waves, and the burst voltage. More particularly, the burst control circuit 107A converts the number of burst waves so that burst wave length corresponds to the designated spatial length and controls the pulse generator 1032 accordingly. In addition, the burst control circuit 107A makes the burst voltage change according to burst length so that the transmission power is within safety standards to the living body under control of the transmitter 102B.

The gate control circuit 107B controls a range gate circuit 105Ea and a range gate circuit 105Eb (the range gate width and the timing by which the range is gated) described hereinafter according to either the sample volume setting device 108 of the burst control circuit 107A. Namely, the gate control circuit 107B controls the range gate circuit 105Ea and the range gate circuit 105Eb according to the space length or the depth of the sample volume of the marker which is designated by the sample volume setting device 108. In addition, the gate control circuit 107B controls the range gate circuit 105Ea and the range gate circuit 105Eb according to the burst wave length converted by the burst control circuit 107A. Thus, the timing and gate width by which range gate gates the Doppler signals in accordance with the marker can be controlled. This control can be performed by providing the range gate circuit 105Ea and the range gate circuit 105Eb with range gate control signals. The timing of gating of the range gate is reckoned from the time that echo signals (Doppler signals) from depth 0 reach the range gate 105Ea, 105Eb.

The transmission unit 102 drives the probe 101 under the control of the burst control circuit 107A. The transmission unit 102 includes a pulse generator 102A which generates a series of pulses in relation to the burst wave number according to the burst control signals designated by the burst control circuit 107A, a transmitter 102B which provides the probe 101 with a predetermined drive voltage (drive signal) with a transmission timing and drive frequency defined by the pulses provided form the pulse generator 102A and in accordance with the burst control signals provided from the burst control circuit 107A. The transmitter 102B generates the series of pulses of the burst wave according to the burst wave number under control of the transmitting timing signal provided from the control timing generator. In addition, the burst wave may be transmitted at an arbitrary timing during blanking of the transmitting rate signals. However, in this embodiment the burst wave starts to be transmitted during the ramp down period for blanking of the transmitting rate signal, as discussed in more detail hereinafter.

The probe 101 repeatedly transmits a series of ultrasonic pulses (burst wave) into a moving target (for example, blood flow) in a patient, and repeatedly receives echo signals reflected by the difference of the acoustic impedance (scatter of each depth). The probe 101 includes a large number of piezoelectric transducers arrayed in a row. These piezoelectric transducers transmit and receive the ultrasonic pulses. The piezoelectric transducers transmit the burst wave into the predetermined position of the patient according to the drive signal provided from the transmitter, and receive echo signals reflected due to the difference in the acoustic impedance (echoes from scatter of each depth) by using either some or all of the piezoelectric transducers.

Next, the relation between the probe 101 and the transmitter 102B is briefly explained. The transmitter 102B generates the drive signals with a gradual timing applied to each piezoelectric transducer according to the transmitting timing, which gradually varies at every transmission of the burst wave, provided from the control timing generator when obtaining a tomographic image such as B-mode image. Thus, a scanning plane of predetermined position into the body can be scanned. In the case of indicating the frequency spectrum, the transmitter 102B sets up so that the transmitting timing provided from the control timing generator is fixed, and provides each piezoelectric transducer with the drive signals at the fixed timing even if the burst wave is transmitted several times. Thus, the burst wave can be repeatedly transmitted in the same direction several times.

The receiver 103 adds the same delays to the signals from the transducers as those at the time of transmission, after amplifying each reception signal in correspondence to the acoustic impedance of reflected echoes provided from probe 101. Thus, the direction of receiving the ultrasonic beam is the same as the direction of transmission. The output signals of the receiver 103 are provided to the 2D image processing unit 104 and the Doppler-mode processing unit 105.

The 2D image processing unit 104 performs predetermined processing on the output signals provided from receiver 103 in order to indicate the tomographic image such as B-mode image on the TV monitor 106B (described hereinafter). The 2D image processing unit 104 comprises a logarithm amplifier 104A which performs logarithmic amplification on the amplitude of the echo signals provided from receiver 103, an envelope detector 104B which detects an envelope of the echo signals provided from logarithm amplifier 104A, and A/D (analog/digital) converter 104C which converts the detected echo signals into digital signals.

The Doppler-mode processing unit 105 determines the frequency spectrum (or velocity) of the moving target e.g., the blood flow, in the observation region by performing predetermined processing on the output signals provided form the receiver 103. Then, the Doppler-mode processing unit 105 determines information for the moving target (for example, the velocity of blood flow) in the region of the marker designated by the sample volume setting device 108. The Doppler-mode processing unit 105 includes two systems in order to distinguish the moving direction of the moving target (either the moving target moves toward the Doppler beam or the moving target moves away from the Doppler beam). Namely, the Doppler-mode processing unit includes a mixer 105Aa, a mixer 105Ab, an oscillator 105B, a $\pi/2$ phase shifter 105C, a LPF (low-pass filter) 105Da, a LPF 105Db, a range gate circuit 105Ea, a range gate circuit 105Eb, an integrator 105Fa, an integrator 105Fb, a sample and hold circuit 105Ga, a sample and hold circuit 105Gb, a HPF (high-pass filter) 105Ha, a HPF 105Hb, a LPF 105Ia, a LPF 105Ib, and an analyzer 104J. Note that the mixer 105Aa and the LPF 105Da compose a phase detector, as does the mixer 105Ab and the LPF 105Db.

The oscillator 105B generates reference signals with a frequency the same as the central frequency of the transmitted ultrasonic pulses and applies the reference signals directly to the mixer 105Ab, and to the mixer 105Aa through $\pi/2$ phase shifter 105C. The reference signals serve as the frequency and pass reference when the phase of the echo signals (the output signals provided from the receiver 103) are detected.

The $\pi/2$ phase shifter 105C shifts the phase of the reference signals from the oscillator 105B $\pi/2$. The output provided from the oscillator 105B (considered to be the real part) and the output provided from phase shifter 105C (considered to be the imaginary part) make complex reference signals.

The mixers 105Aa, 105Ab detect the output signals provided from the receiver 103 on the basis of the complex reference signals. More particularly, the mixer 105Ab generates the real part signals by multiplication of the reference signals provided from the oscillator 105B (the real part of the complex reference signal) with the output signal provided from the receiver 103. On the other hand, the mixer 105Aa generates the imaginary part signal by multiplication of the reference signal provided from the oscillator 105 phase shifted by $\pi/2$ by phase shifter 105C (the imaginary part of the complex reference signal) with the output signal provided from the receiver 103. Thus, a shift frequency component (to be referred to as Doppler shift fd) due to the Doppler effect which is subtracted a receiving frequency f1 from a transmitting frequency to and high frequency signals of (2f0 +fd) are detected by the output signals provided from the receiver 103.

The LPF 105Da, 105Db rejects the high frequency component of the output signals (to be referred to as Doppler signals) from each mixer 105Aa, 105Ab, and acquires the Doppler shift fd which is the low frequency component of the Doppler signal. Thus, the output signals provided from the receiver are separated from the transmitting frequency component f0, and the frequency blank is dropped to the base band centering around zero. So complex signals which have the Doppler shift fd can be acquired. By using the complex signals, the moving direction of the moving target can be distinguished. Quadrature phase detection acquires the Doppler signals upon rejecting the signals of high frequency domain (the signals are dropped base band) after converting the real signal into the complex signal by multiplication of the echo signals by the complex basis signal (reference signals), which have the same frequency as the transmitting frequency, using the mixer 105Aa, 105Ab, LPF 105Da, LPF 105Db.

The range gate circuit 105Ee, 105Eb passes the detected Doppler signals, integrated through the predetermined integration interval by an integration circuit 105Fa, 105Fb, according to the range gate control signals. Namely, the range gate circuits 105Ea, 105Eb gate the Doppler signals in the observation region at the predetermined timing.

The integrator 105Fa, 105Fb, integrates the Doppler signals gated by the range gate circuit 105Ea, 105Eb. Namely, the integrator 105Fa, 105Fb integrates the Doppler signals passing through the range gate circuit 105Ea, 105Eb and thereby acquires the sum of the Doppler signals. The Doppler signals gated by the range gate circuit 105Ea, 105eb are integrated in time. In addition, the Doppler shift signals (which for convenience show the time transition of the Doppler signal, as distinguished from the Doppler signal) are obtained by repeated transmission and reception at the pulse repetition time (PRT).

The sample and hold circuits 105Ga, 105Gb hold the integrated result until the result of next integration is obtained and then are reset before the integrators 105Fa, 105Fb integrate. Namely, the sample and hold circuits 105Ga, 105Gb hold the integrated result for the predetermined rate after sampling a integrated result.

The HPFs 105Ha, 105Hb reject signals of less than several hundred hertz from the Doppler shift signals obtained by the sample and hold circuits 105Ga, 105Gb. Thus, clutter components, i.e., the unnecessary frequency components from slow moving parts such as the walls of internal organs moving slower than the blood, are rejected.

The LPFs 105Ia, 105Ib obtain the low frequency component of the Doppler shift signals by eliminating a high frequency component of the Doppler shift signals provided from the HPFs 105Ha, 105Hb. Thus, the band of the Doppler shift signals is restricted to the Nyguist frequency determined by the reciprocity of the pulse reception time (PRT).

The analyzer 105J analyzes the frequency of the Doppler shift signal passing through the LPFs, 105Ia, 105Ib, using, for example, a Fast Fourier Transform (FFT) circuit. Namely, the analyzer 105J obtains the frequency spectrum of the Doppler signals in the range gate, such as may be produced by blood flow, by analyzing the frequency of the Doppler shift signal. The frequency spectrum is repeatedly calculated in a constant time cycle, and either is provided to the image memory 106A or is provided to the image memory 106A after being converted to a velocity distribution. The frequency spectrum is then displayed on the TV-monitor after being converting into a luminance signal.

The display unit 106 indicates the results processed by the 2D image processing unit 104 and the Doppler-mode processing unit 105. Display unit 106 includes the image memory 106A, in which is stored output signals processed by the tomographic processing unit 104 and output signals processed by the Doppler-mode processing unit 105, and the TV monitor 106B which displays a tomographic image, such as the B-mode image, and the time variation of the frequency spectrum after being provided the output signals of the 2D image processing unit 104 and the output signals of the Doppler-mode processing unit 105 in the same period from the image memory 106A. In addition, the TV monitor 106B displays the tomographic image (including the marker) and the distribution showing the time variation of frequency spectrum (the axis of ordinate represents either flow velocity or frequency and the axis of abscissa represents time) either in a display or in two displays as may be desired.

Figure 2A:
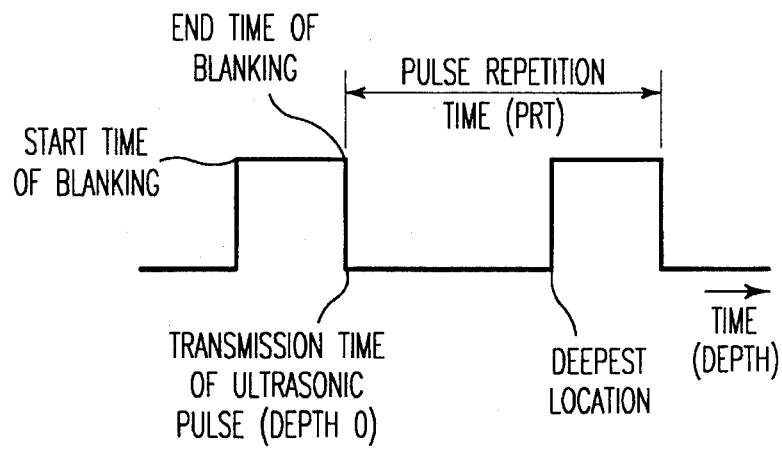
FIG. 2 is a timing diagram illustrating the timing and width of the gating of the range gate by which the Doppler signals are obtained when a burst wave is transmitted once.
Figure 2B:
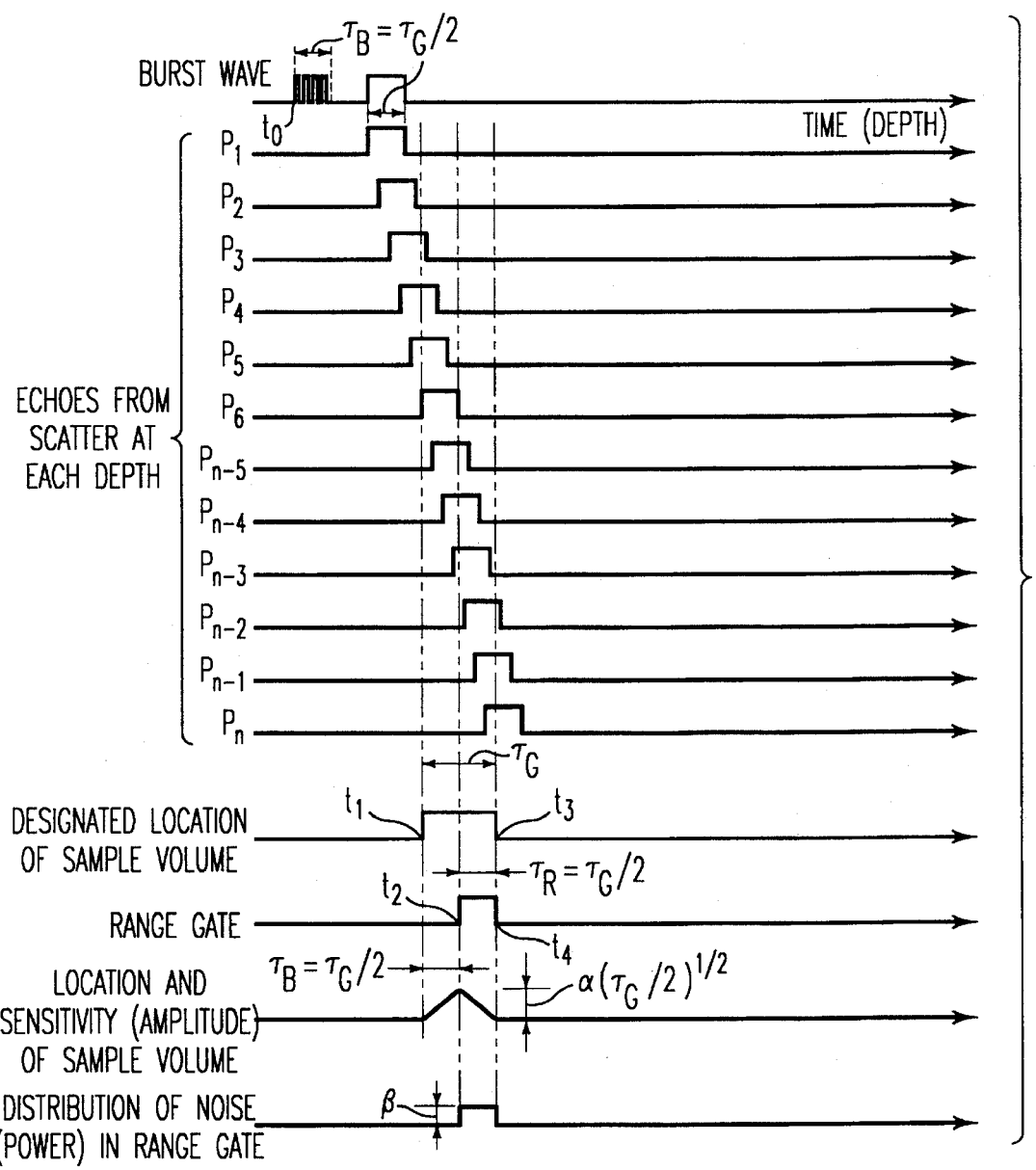

Next, the relationship among burst voltage, the burst wavelength (the burst number), the gate width and depth of which the range gate is gated, and the Doppler signal in the designated sample volume designated by the sample volume setting device 108 is described. FIG. 2 shows the timing of gating of the range gate, the gate width and the burst length when the burst length is converted according to the space length of the designated sample volume (for example, the case the burst wave length is designated to be one-half as long as the designated spatial length of the sample volume). As described hereinafter, the burst wave is transmitted from the turning_off time of blanking of the rate signals in order to facilitate explanation. In FIG. 2, the axis of abscissa shows the time corresponding to from the extremity of the probe 101 to a distance (depth) of a depth direction. Time to refers to time of the depth 0, i.e., the time that the reflected echoes are first received by the probe 101. In addition, P1–Pn refer to scatter at each depth (each acoustic impedance) from which the burst wave reflects in the patient in order from the shallowest position. FIG. 2. shows as zero the time lag from the time to when the reflected echoes are first received by the probe 101 to the time reflected echoes first arrive at the range gate circuit 105Ee, 105Eb by means of passing through the receiver 103, the mixer 105Aa, 105Ab, and the LPF 105Da, 105Db in order to facilitate understanding.

Figure 3A:
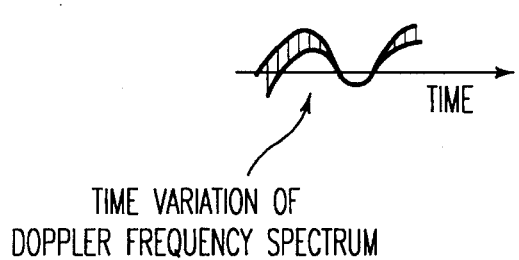
FIG. 3 is an illustration of an example of a display on a TV monitor.
Figure 3B:
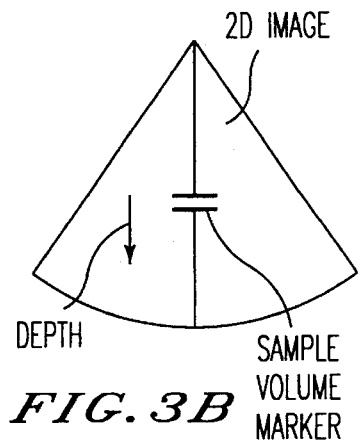
Figure 4:
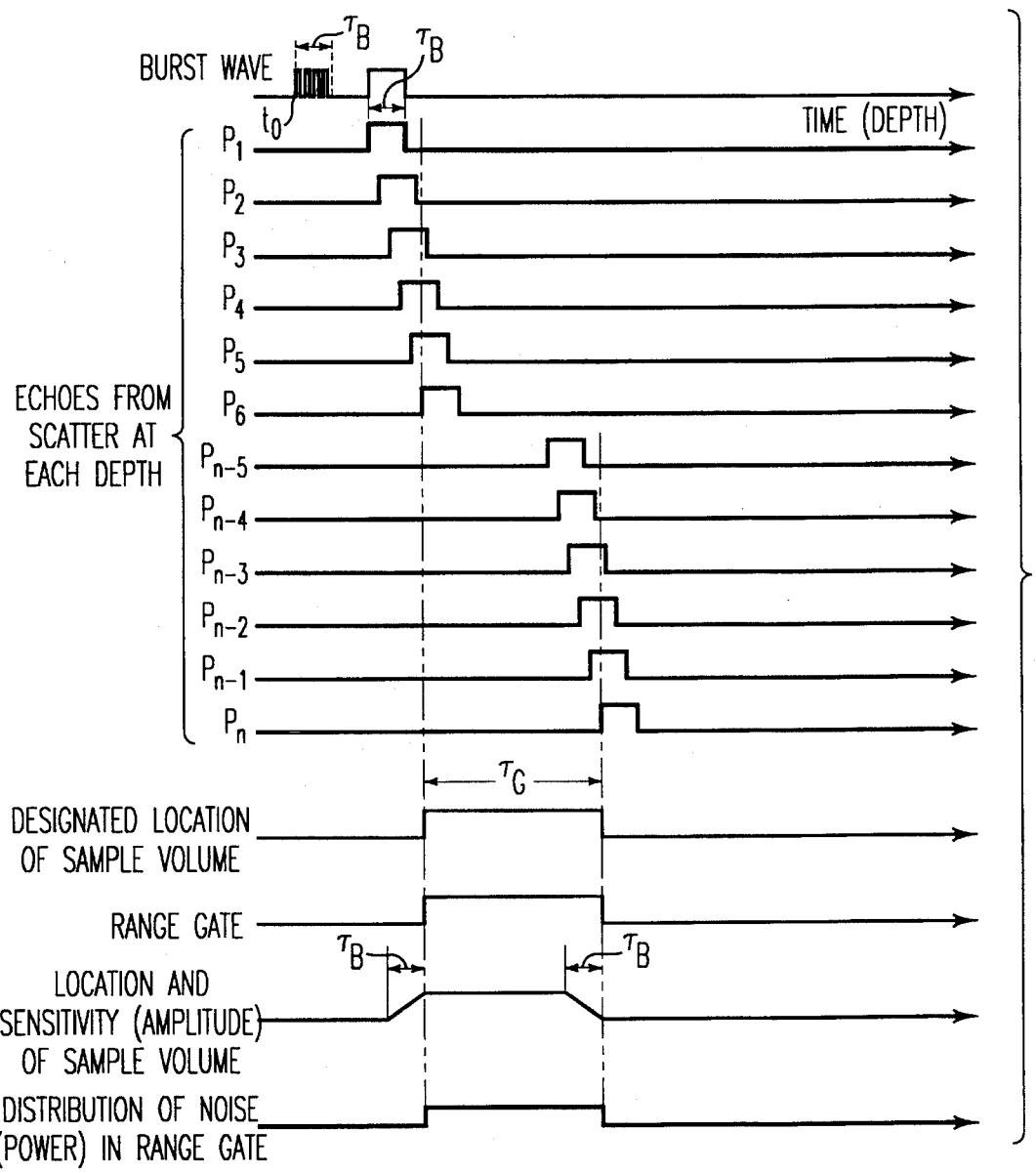
FIG. 4 is a timing diagram illustrating the timing and the range gate width of conventional gating of the range gate by which Doppler signals are conventionally obtained when a burst wave is transmitted once.

Referring now to FIG. 3, a sample volume $\tau_G$ and the depth of the marker (the designated sample volume) displayed with B-mode image on the TV-monitor 106B are designated by the sample volume setting device 108.

The burst control circuit 107A controls the pulse generator 102A so that the burst length is converted to the spatial length $\tau_G$ of the designated sample volume according to the designation. For example, the burst control circuit 107A sets up the number of bursts so that the burst wavelength $\tau B$ may be one-half times as long as the spatial length $\tau_G$ of the designated sample volume. The burst control circuit 107A sets up the number of the burst wave so that the burst wavelength may be one-half as long as the spatial length $\tau_G$ of the designated sample volume since the unit converts space length into time length but unit converter.

At the same time, the burst control circuit 107A controls the transmitter 102B according to the burst voltage so that a burst voltage within a transmission power safety standard is set. More particularly, when the power of the safety standard is P, the pulse repetition frequency (PRF) is $f_r$, the burst voltage is $A_b$, the burst wavelength is $\tau_B$, and the proportional coefficient including the electro-acoustic transformation efficiency of the probe 101 is K, the burst voltage is given by $$A_B = \sqrt{\frac{P}{k\tau_B f_r}} \quad (2)$$

So, in the case that the burst wavelength $\tau_B$ is designated one-half of the space length $\tau_G$ of the setting sample volume, the burst voltage is given by $$A_{1/2} = \sqrt{\frac{2P}{k\tau_G f_r}} \quad (3)$$

On the other hand, the gate control circuit 107B controls the range gate circuit 105Ea, 105Eb so that the gate width of the range gate may be shorter than the space length of the designated sample volume so that the spatial length of the sample volume, which is the sum of the burst wave length $\tau_B$ and the gate width $\tau_R$, is adjusted to the space length of the marker (the sample volume designated by the sample volume setting device 108). At the same time, the gate control circuit 107B controls the range gate circuit 105Ea, 105Eb so that the depth of the sample volume is adjusted to the depth of the designated sample volume (the marker). The timing and the gate width by which the range gate is gated and controlled is explained in more detail hereinafter.

As shown in FIG. 2, the gate control circuit 107B controls the range gate circuit 105Ea, 105Eb so that the turning on (starting) time t2 of the range gate may be designated later than the time t1 in the burst wavelength, and the turning off (ending) time t4 of the range gate may be designated the same as the. Namely, if td is the time corresponding to the distance which the ultrasonic pulse propagates from the extremity of the probe 101 to the shallowest position of the marker, the range gate circuit 107B sets up the start time t2 of the range gate so that twice the time td corresponds to the burst wave length $\tau_B$ plus the time from t0 to t1. In other words, 2td =(t0–t1) +$\tau_B$. Thus, the range gate is gated from the position which is deeper than the shallowest position of the designed sample volume in the burst wavelength $\tau_B$ to the deepest position of the designated sample volume. Namely, the gate width of range gate is designated by subtracting the set burst wavelength from the designated spatial length of the sample volume. For example, in the case that the burst wavelength is designated one-half times as long as the space length of the designated sample volume $\tau_G$, the gate control circuit 107B sets up the gate width $\tau_R$ by subtracting the burst wavelength $\tau_B$ from the spatial length $\tau_G$ of the designated sample volume.

Thus, the spatial lengths of the sample-volume and the marker (the designated sample volume) coincide by setting the gate width shorter than the spatial length of designated sample volume and the start time of the range gate corresponds to the designated sample volume plus the burst wave length. At the same time, the shallowest position of the sample volume is adjusted to the shallowest position of the marker (the sample volume designated by the sample volume setting device 108), and the deepest position of the sample volume is adjusted to the deepest position of the marker (the sample volume designated by the sample volume setting device 108).

Next, the operation of the embodiment of FIG. 1 will be described. The burst wave (a series of ultrasonic pulses) is repeatedly transmitted into the predetermined position of the patient from the probe 101, and echo signals reflected within the position are received by the probe 101. After the echo signals are processed by the 2D image processing unit 104, they are provided to the TV monitor 106B through the image memory 106A. On the TV monitor 106B, the tomographic image (B-mode image) derived from the reflected echo signal is displayed. An operator refers to the TV monitor 106B on which the tomographic image and the marker are indicated to designate the location (for example, a blood vessel) and the region (spatial length and depth) of the marker by, for example, moving a track ball on the operating table in correspondence with the marker in the scanning plane.

According to the sample volume setting device 108, the burst control circuit 107A sets up the burst wave number so that a burst wave, having a burst wavelength less than the range of the spatial length designated by the sample volume setting device 108, is transmitted from the probe 101, and provides the pulse generator 102A with the burst control signals corresponding to the number of bursts. At the same time, the burst control circuit 107A sets up the burst voltage (for example, a value which is in proportion to a square root of reciprocal about one-half the spatial length of the designated sample volume) so that the burst wave with a transmission power within a safety standard may be transmitted from the probe 101 to the living body, and provides the transmitter 102B with the burst control signals corresponding to the burst voltage.

On the other hand, the gate control circuit 107B determines the timing and the gate width by which the range gate is gated according to the designation of the sample volume setting device 108, and provides the range gate circuit 105Ea, 105Eb with the range control signals corresponding to its determination.

After performing such set up, the pulse generator 102A repeatedly provides the transmitter 102B with the predetermined pulses of the number of burst (for example, four pulses) in a constant time cycle of 1 burst wave according to the burst control signals provided from the burst control circuit 107A. Namely, the pulse generator 102A repeatedly provides the transmitter 102B with the series of ultrasonic pulses according to the pulse repetition frequency (PRF). Thus, the burst wave is set to a predetermined burst wavelength. Then, the burst control circuit 107A provides the transmitter 102B with the setting value of a predetermined burst voltage. Thus, the burst voltage is set to a predetermined voltage $A_B$. After performing such setting, the transmitter 102B drives each piezoelectric transducer of the probe 101 by the series of pulses about the predetermined voltage. By this, the probe 101 repeatedly transmits the burst wave for a moving target in a constant time cycle, in a constant transmission power, and in the same direction. (In the case of the tomographic image-mode, the burst wave is transmitted in a different direction.) The burst wave transmitted from the probe 101 is reflected as scatter at each depth. The reflected echoes are received with a timing corresponding to the depth of the scatter by either a part of a piezoelectric transducer or by all of the transducers. Each reflected echo received by the probe 101 is converted by the receiver 103 to a received signal corresponding to an acoustic impedance of each echo. Thereafter, the receiver 103 amplifies the reflected echoes of a predetermined amplitude, and adds the echo signals with delay times substantially equal to the delay times in the case of transmitting. The reception signals are applied to a logarithmic amplifier 104A and a mixer 105Ae, 105Ab.

The reception signals applied to the logarithmic amplifier 104A undergo logarithmic amplification, and are then applied to envelope detector 104B which detects the envelope of the amplitudes about the high frequency (RF) reception signals centered around the transmitting frequency. The, the A/D converter 104C converts the digital signals from the analog envelope detector 104B, and provides the image memory with digital signals.

On the other hand, the mixer 105Aa multiplies signals from the oscillator 105B phase shifted π/2 by the π/2 phase shifter with reception signals from the receiver 103. Thus, the reception signals applied to the mixers 105Aa, 105Ab are multiplied by the complex reference signals, and are provided to LPF 105Da, 105Db as signals including Doppler signals and the high frequency components. The LPF 105Da, 105Db reject the high frequency, and pass only the Doppler signals. The Doppler signals are provided to the range gate circuit 105Ea, 105Eb.

The range gate circuits 105Ea, 105Eb gate the Doppler signals with a predetermined timing according to the range gate control signals provided from the burst control circuit 107A, and cut down the Doppler signals. Namely, the range gate circuits 105Ea, 105Eb cut down the Doppler signals by applying the range gate having the range between a position deeper than the shallowest position of the designated sample volume by the burst wave length $\tau_B$ and the shallowest designated location of the marker to the deepest position of the marker, and provide the result to integrators 105Fa, 105Fb. The gate width of the range gate is determined by subtracting the burst wave length from the spatial length of the marker. The Doppler signals cut down by the range gates are integrated by the integrators 105Fe, 105Fb, and are provided to sample and hold circuits 105Ga, 105Gb as the Doppler shift signals. The sample and hold circuits 105Ga, 105Gb hold a last integrated result until a result of the next integration is obtained. And, the sample and hold circuits 105Ga, 105Gb keep providing HPFs 105Ha, 105Hb, with the held integrated result and reset the result when the next integration is input. In HPFs 105Ha, 105Hb, the low frequency content of the Doppler shift signals is rejected. The content of the Doppler shift signals passed by HPF 105Ha, 105Hb, is restricted in a band by the LPF 105Ia, 105Ib, and is provided to analyzer 105J. The analyzer 105J performs predetermined frequency analyzing on the filtered Doppler shift signals, and provides an image memory 106A with the analyzed results. The image memory 106A stores the analyzed result from the analyzer 105J with the analyzed result provided form the 2D image processing unit 104 (A/D-C 104C), and provides TV monitor 106B with these results in the same period. Thus, TV monitor 106B displays a tomographic image, a marker, and frequency spectrum obtained due to gating a range gate to the Doppler signals in accordance with the marker designation by the sample volume setting device 108.

In the above embodiment, under the condition that the transmission power is within the safety standard to the human body, and the sum of a burst wave length $\tau_B$ and a gate width $\tau_B$ is adjusted to the spatial length of the sample volume, the signal to noise ratio (SNR) can be improved because of adjustment of the burst wave and the gate width. Especially, in the case the transmission power is set to the value of the higher limit, by controlling the pulse generator 102A, the transmitter 102B, and the range gate circuit 105Ea, 105Eb so that the burst wave length $\tau_B$, and the gate width $\tau_B$ may be one-half times the space length of the designated sample volume $\tau_G$, the best signal to noise ratio in the spatial length of the sample volume can be obtained.

The effect is next described in detail. As shown in equation (2), when the value of power P, proportional coefficient k, the pulse repetition frequency (PRF) $f_r$ is constant, and the burst wave length is $\tau_B$ the (transmitting) burst voltage is in proportion to $1/\sqrt{\tau_B}$. Since the amplitude of the receiving (transmitting) burst wave is in proportion to the burst wave, the amplitude of the burst wave to the burst wave length $\tau_B$ is given by $$\alpha/\sqrt{\tau_B} .$$

Where $\alpha/\sqrt{\tau_B}$ is a coefficient representing either the power P, the coefficient k, or the PRF fr. And the largest sensitivity of the sample volume which is represented by the amplitude is given by integrating the burst wave, either transmitted or received. Namely, since the amplitude of the burst wave (of the reception) is $\alpha/\sqrt{\tau_B}$, the largest sensitivity of the sample volume is given by $$\tau_B * \alpha/\sqrt{\tau_B} = 2\sqrt{\tau_B} .$$

Since a result Sd of integration of Doppler signals gated the range gate is given by a value of integration about a sensitivity of a sample volume, the result Sd of the integration of the Doppler signals gated the range gate is given by $$\begin{aligned} Sd &= \alpha\sqrt{\tau_B}\left[\frac{1}{2}\tau_B + (\tau_R - \tau_B) + \frac{1}{2}\tau_B\right] \\ &= \alpha\sqrt{\tau_B \tau_R} \\ &= \alpha\sqrt{\tau_B}\ (\tau_G - \tau_B) \end{aligned}$$

On the other hand, the greatest part of the noise included in the Doppler signals passed by the range gate is white noise which is restricted by the LPF. Since noise increases due to power, the amount of noise is calculated by the power in the noise band. So the result Nd2 of integration of noise power cut down by the range gate is given as follows when the power value of each noise in the range gate is β.

$$Nd2 = \beta * \tau_R = \beta(\tau_G - \tau_B)$$

The signal to noise ratio (SNR) is given by the ratio of signals of sample points to a power of noise. So when a proportionality coefficient is γ, signal to noise ratio is given by $$\begin{aligned} SNR &= \gamma S_d^2/N_{D2} \\ &= \frac{\gamma[\alpha\sqrt{\tau_B}\ (\tau_G - \tau_B)]^2}{\beta(\tau_G - \tau_B)} \\ &= \frac{\gamma\alpha^2\tau_B(\tau_G - \tau_B)}{\beta} \end{aligned}$$

The gate width $\tau_R$ and the burst wave length $\tau_B$ which yield the best SNR are obtained when the derivative $d(SNR)/d\tau_B = 0$. Namely, the burst wave length $\tau_B$ and the gate width $\tau_R$ are given as follows:

$$\tau_B = \tau_G/2,\ \tau_R = \tau_G - \tau_B = \tau_G/2$$

Especially, in the embodiment, in case the burst wave length and the gate width are designated $\tau_B = \tau_R = \tau_G/2$, the ratio of signal to noise obtained is the best value.

In addition, in the described embodiment, since the gate width $\tau_R$ is designated shorter than the space length of the marker $\tau_G$ by the burst wave length $\tau_B$, the spatial length of the sample volume which is the sum of the gate width and the burst wave length can equal the space length of the marker.

In case the burst wave is transmitted from the turning off time of the blanking of the rate signals, the time of shallowest location of the sample volume can be adjusted to the shallowest time of the marker since the start time of the range gate is designated later than the start time of the marker burst wave length.

Therefore, the space length and the depth of the sample volume can match the space length and the depth of the marker. Thus, the Doppler signals passed by the range gate include the echoes from acoustic impedance in the region designated by the marker, and do not include the echoes from acoustic impedance outside the range designated by the marker. Therefore, the precision of the location (distance) of the sample volume can be improved. Moreover, a leak of detected signals and the generation of artifact can be prevented.

According to the described embodiment, the space length and the depth of the sample volume are designated by using the marker on the TV monitor 106B. However, the space length and the depth of the sample volume may be designated by various means, e.g., by inputting a number, and by designating coordinates along the axes in the subject geometry.

According to the present invention, either analog or digital processing can be performed in the Doppler mode processing unit 105.

Also, the time of the shallowest location of the sample volume is adjusted to the time of the shallowest location of the marker by transmitting the burst wave from the end time of blanking, and designating the start time of the range gate to be later than the start time of the marker by the burst wave length. However, the time of shallowest location of the range gate may be designated to be later by the time corresponding to the sum of the shallowest depth of the marker and the burst wave length by means of reckoning from the time to when the reflected echoes from the depth 0 are received by the probe 101 if the time of shallowest location of the sample volume is adjusted to the time of shallowest location of the marker.

Figure 5A:
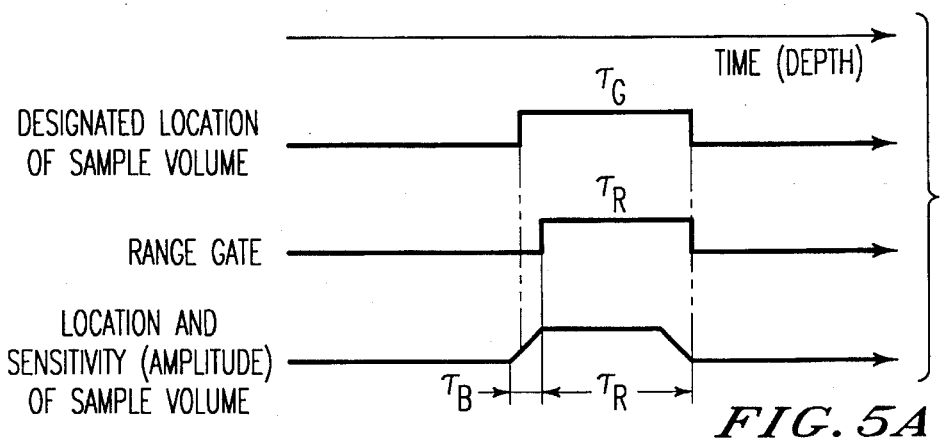
FIG. 5 is a timing diagram illustrating examples of the timing and the gate width of the gating of the range gate applied to the Doppler signals obtained when a burst wave is transmitted once, according to the present invention.
Figure 5B:
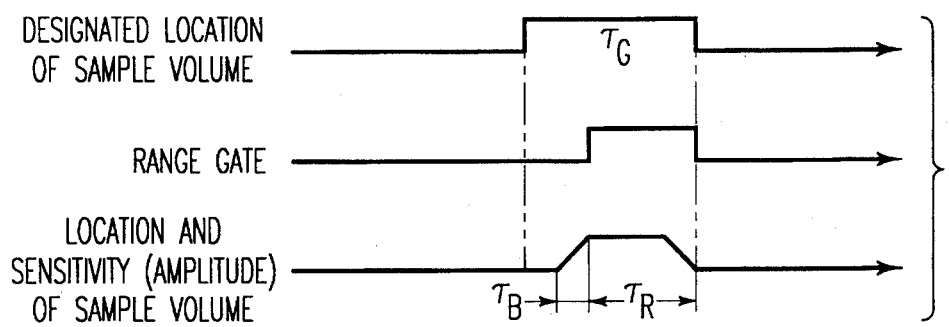
Figure 5C:
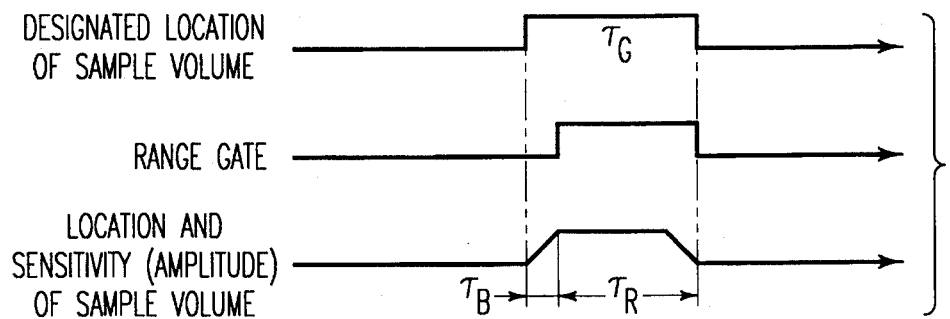
Figure 5D:
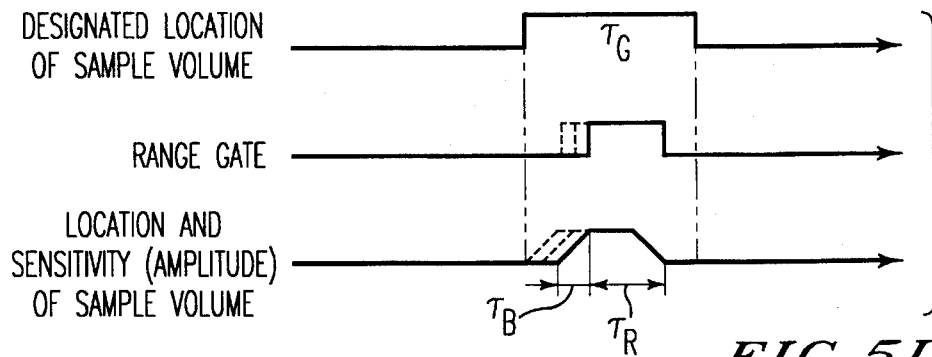

In addition, according to the embodiment, the burst wave length and the gate width are designated one-half times the spatial length of the designated sample volume in order to match the spatial length of the sample volume to the space length of the marker. However, timing as shown in FIG. 5(a), (b), (c) may be performed if the gate width is designated shorter than the space length of the designated sample volume. FIGS. 5(a), 5(b) and 5(c) show examples of the burst wavelength, the gate width, and the timing of range gate gating. In FIG. 5(a), the gate width is designated shorter than the space length of the designated sample volume (for example, the marker), and the sum of the burst wavelength and the gate width is designated larger than the space length of the marker. Thus, the artifact can be reduced. In FIG. 5(b), the gate width is designated shorter than the space length of the designated sample volume (for example, the marker), and the sum of the burst wavelength and the gate width is designated smaller than the space length of the marker. Thus, the generation of the artifact can be prevented although the marginal signals are not detected. In FIG. 5(c), the gate width is designated shorter than the space length of the designated sample volume (for example, the marker), and the sum of the burst wavelength and the gate width is adjusted to the space length of the marker. Thus, a leak of detecting signals and the generation of the artifact can be prevented.

According to the described embodiment, the deepest position of the range gate is adjusted to the deepest position of the designated sample volume (the marker). However, the deepest position of the range gate may not be adjusted the deepest position of the designated sample volume if the gate width is designated shorter than the space length of the designated sample volume.

Further, according to the described embodiment, the burst wavelength is converted in the region of the marker. However, the burst wavelength may be designated constant if the gate width is designated shorter than the space length of the designated sample volume.

Also, the present invention is not limited to an ultrasonic diagnostic apparatus using burst waves, but applies generally to use of ultrasonic pulses with a certain pulse length.

Additional advantages and modifications will readily occur to those skilled in the art. Therefore, the invention in its broader aspects is not limited to the specific details, representative device, and illustrated example shown and described herein. Accordingly, various modifications may be without departing from the spirit or scope of the general inventive concept as defined by the appended claims and their equivalents.

What is claimed as new and desired by Letters Patent of the United States is:

1. An ultrasonic diagnostic apparatus comprising:

ultrasonic transmission and reception means for transmitting ultrasonic pulses into a moving target in the body, and receiving echo signals reflected from the moving target;

driving means for generating ultrasonic pulses to be transmitted by said ultrasonic transmission and reception means;

processing means for detecting Doppler signals by detecting phase of the echo signals;

sample volume setting means for designating an observation region in the moving target by means of a range gate having a gate width;

a sampling means for sampling the Doppler signals in the range gate; and a control means for controlling said sampling means so that the gate width is smaller than the width of the observation region according to the designation of said sample volume setting means.

2. An apparatus as recited in claim 1, further comprising:

analyzing means for analyzing information of the moving target on the basis of the Doppler signals sampled by said sampling means;

a tomographic image generating means for generating image data to obtain a tomographic image of the body by detecting the echo signals obtained from said ultrasonic transmission and reception means; and a display unit for displaying the tomographic image on the basis of the image data, the marker corresponding to the sample volume, and the result of said analyzing means.

3. An apparatus according to claim 2, in which said control means controls said driving means so that the ultrasonic pulse length is defined in accordance with the designation of said sample volume setting means, and controls said sampling means so that the gate width is smaller than the spatial length of the sample volume according to the designation of said sample volume setting volume.

4. An apparatus according to claim 2, in which said control means controls said sampling means and said driving means so that the sum of the ultrasonic pulses length and the gate width is adjusted to the sample volume designated by said sample volume setting means.

5. An apparatus according to claim 2, in which said control means controls said sampling means and said driving means so that the gate width equals the ultrasonic pulse length.

6. An apparatus according to claim 2, in which said control means controls said sampling means so that a time from when the echo signals from depth zero arrives at said range sampling means to a start time of the range gate is longer than a time which it takes said ultrasonic pulses to propagate twice the distance from depth zero to a shallowest point of the observation region, and a time from when echo signals from depth zero arrive at said sampling means to an end time of the range gate is shorter than a time which it takes the ultrasonic pulses to propagate twice the distance from depth zero to a deepest point of the observation region.

7. An apparatus according to claim 2, in which said control means controls said sampling means so that a time from when the echo signals from depth zero arrive at the sampling means to an end time of range gate is equal to a time which it takes the ultrasonic pulses to propagate twice the distance from depth zero to a deepest point of the observation region.

8. An apparatus according to claim 2, wherein said ultrasonic diagnostic apparatus comprises two parallel systems, each including said processing means and said sampling means.

9. An apparatus according to claim 1, in which said control means controls said driving means so that the ultrasonic pulse length is converted according to the designation of said sample volume setting means, and controls said sampling means so that the gate width is smaller than the spatial length of the sample volume according to the designation of said sample volume setting means.

10. An apparatus according to claim 3, in which said control means controls said sampling means and said driving means so that the sum of the ultrasonic pulses length and the gate width is adjusted to the sample volume designated by said sample volume setting means.

11. An apparatus according to claim 9, in which said control means controls said sampling means and said driving means so that the gate width equals the ultrasonic pulse length.

12. An apparatus according to claim 9, in which said control means controls said sampling means so that a time from when the echo signals from depth zero arrive at said range sampling means to a start time of range gate is longer than a time which it takes said ultrasonic pulses to propagate twice the distance from depth zero to the shallowest point of the observation region, and a time from when echo signals from depth zero arrive at said sampling means to an end time of the range gate is shorter than a time which it takes the ultrasonic pulses to propagate twice the distance from depth zero to a deepest point of the observation region.

13. An apparatus according to claim 9, in which said control means controls said sampling means so that a time from when the echo signals from depth zero arrive at sampling means to an end time of range gate is equal to a time which it takes the ultrasonic pulses to propagate twice the distance from depth zero to a deepest point of the observation region.

14. An apparatus according to claim 9, wherein said ultrasonic diagnostic apparatus comprises two parallel systems, each including said processing means and said sampling means.

15. An apparatus according to claim 1, in which said control means controls said sample means and said driving means so that the sum of the ultrasonic pulse length and the gate width matches the sample volume designated by said sample volume setting means.

16. An apparatus according to claim 15, in which said control means controls said sampling means and said driving means so that the gate width equals the ultrasonic pulse length.

17. An apparatus according to claim 15, in which said control means controls said sampling means so that a time from when the echo signals from depth zero arrive at said range sampling means to a start time of the range gate is longer than a time which it takes said ultrasonic pulses to propagate twice the distance from depth zero to a shallowest point of the observation region, and a time from when each signals from depth zero arrive at said sampling means to an end time of the range rate is shorter than a time which it takes the ultrasonic pulses to propagate twice the distance from depth zero to a deepest point of the observation region.

18. An apparatus according to claim 15, in which said control means controls said sampling means so that a time from when the echo signals from depth zero arrives at the sampling means to an end time of the range gate is equal to a time which it takes the ultrasonic pulses to propagate twice the distance from depth zero to a deepest point of the observation region.

19. An apparatus according to claim 15, wherein said ultrasonic diagnostic apparatus comprises two parallel systems, each including said processing means and said sampling means.

20. An apparatus according to claim 1, in which said control means controls said sampling means and said driving means so that the gate width may equal the ultrasonic pulse length.

21. An apparatus according to claim 20, in which said control means controls said sampling means so that a time from when the echo signals from depth zero arrive at said range sampling means to a start time of the range gate is longer than a time which it takes said ultrasonic pulses to propagate twice the distance from depth zero to a shallowest point of the observation region, and time from when echo signals from depth zero arrive at said sampling means to an end time of the range gate is shorter than a time which it takes the ultrasonic pulses to propagate twice the distance from depth zero to a deepest point of the observation region.

22. An apparatus according to claim 20, in which said control means controls said sampling means so that a time from when the echo signals from depth zero arrive at the sampling means to an end time of the range gate is equal to a time which it takes the ultrasonic pulses to propagate twice the distance from depth zero to a deepest point of the observation region.

23. An apparatus according to claim 20, wherein said ultrasonic diagnostic apparatus comprises two parallel systems, each including said processing means and said sampling means.

24. An apparatus according to claim 1, in which said control means controls said sampling means so that the time from when the echo signals from depth zero arrive at said range sampling means to the start time of the range gate is longer than time which it takes said ultrasonic pulses to propagate twice the distance from depth zero to a shallowest point of the observation region, and a time from when echo signals from depth zero arrive at said sampling means to an end time of the range gate is shorter than the time which it takes the ultrasonic pulses to propagate twice the distance from depth zero to the deepest point of the observation region.

25. An apparatus according to claim 24, in which said control means controls said sampling means so that a time from when the echo signals from depth zero arrive at the sampling means to an end time of range gate is equal to a time which it takes the ultrasonic pulses to propagate twice the distance from depth zero to a deepest point of the observation region.

26. An apparatus according to claim 24, wherein said ultrasonic diagnostic apparatus comprises two parallel systems, each including said processing means and said sampling means.

27. An apparatus according to claim 1, in which said control means controls said sampling means so that a time from when echo signals from depth zero arrive at sampling means to an end time of the range gate is equal to the time which it takes the ultrasonic pulses to propagate twice the distance from depth zero to a deepest point of the observation region.

28. An apparatus to claim 27, wherein said ultrasonic diagnostic apparatus comprises two parallel systems, each including said processing means and said sampling means.

29. An apparatus according to claim 1, wherein said ultrasonic diagnostic apparatus comprises two parallel systems, each including said processing means and said sampling means.

* * * * *